United States Patent [19]

Prüss

[11] Patent Number: 5,201,252
[45] Date of Patent: Apr. 13, 1993

[54] HYDRAULIC CONTROL FOR SHIFT ELEMENTS OF AN AUTOMATIC TRANSMISSION

[75] Inventor: Ludwig Prüss, Brunswick, Fed. Rep. of Germany

[73] Assignee: Volkswagen AG, Wolfsburg, Fed. Rep. of Germany

[21] Appl. No.: 747,683

[22] Filed: Aug. 20, 1991

[30] Foreign Application Priority Data

Aug. 23, 1990 [DE] Fed. Rep. of Germany ....... 4026619

[51] Int. Cl.$^5$ ............................................ B60K 41/06
[52] U.S. Cl. ........................................ 74/869; 74/866
[58] Field of Search ................... 74/866, 867, 868, 869

[56] References Cited

U.S. PATENT DOCUMENTS

| | | | |
|---|---|---|---|
| 3,797,330 | 3/1974 | Ushijima | 74/866 |
| 3,943,799 | 3/1976 | Sakai et al. | 74/866 |
| 4,345,489 | 8/1982 | Müller et al. | 74/866 X |
| 4,395,927 | 8/1983 | Müller et al. | 74/869 |
| 4,517,859 | 5/1985 | Nagaoka et al. | 74/869 X |
| 4,691,597 | 9/1987 | Leorat et al. | 74/866 X |
| 4,747,807 | 5/1988 | Nakamura et al. | 74/869 X |

FOREIGN PATENT DOCUMENTS 2901051 7/1980 Fed. Rep. of Germany .
3836754 5/1989 Fed. Rep. of Germany .

*Primary Examiner*—Richard M. Lorence
*Assistant Examiner*—Benjamin Levi
*Attorney, Agent, or Firm*—Brumbaugh, Graves, Donohue & Raymond

[57] ABSTRACT

The disclosed hydraulic control system for an automatic transmission has a main pressure valve to control main pressure produce by a pump, a manually operated slide valve to select a transmission condition, and electromagnetically operable valve arrangements receiving main pressure from the manual slide valve and by which the various main pressure levels are adjustable at corresponding transmission shift elements. At least one of the electromagnetic valve arrangements has a slide valve and an electromagnetic valve capable of being influenced by a control unit and at least one face of the slide valve is capable of being acted on by pressure.

11 Claims, 1 Drawing Sheet

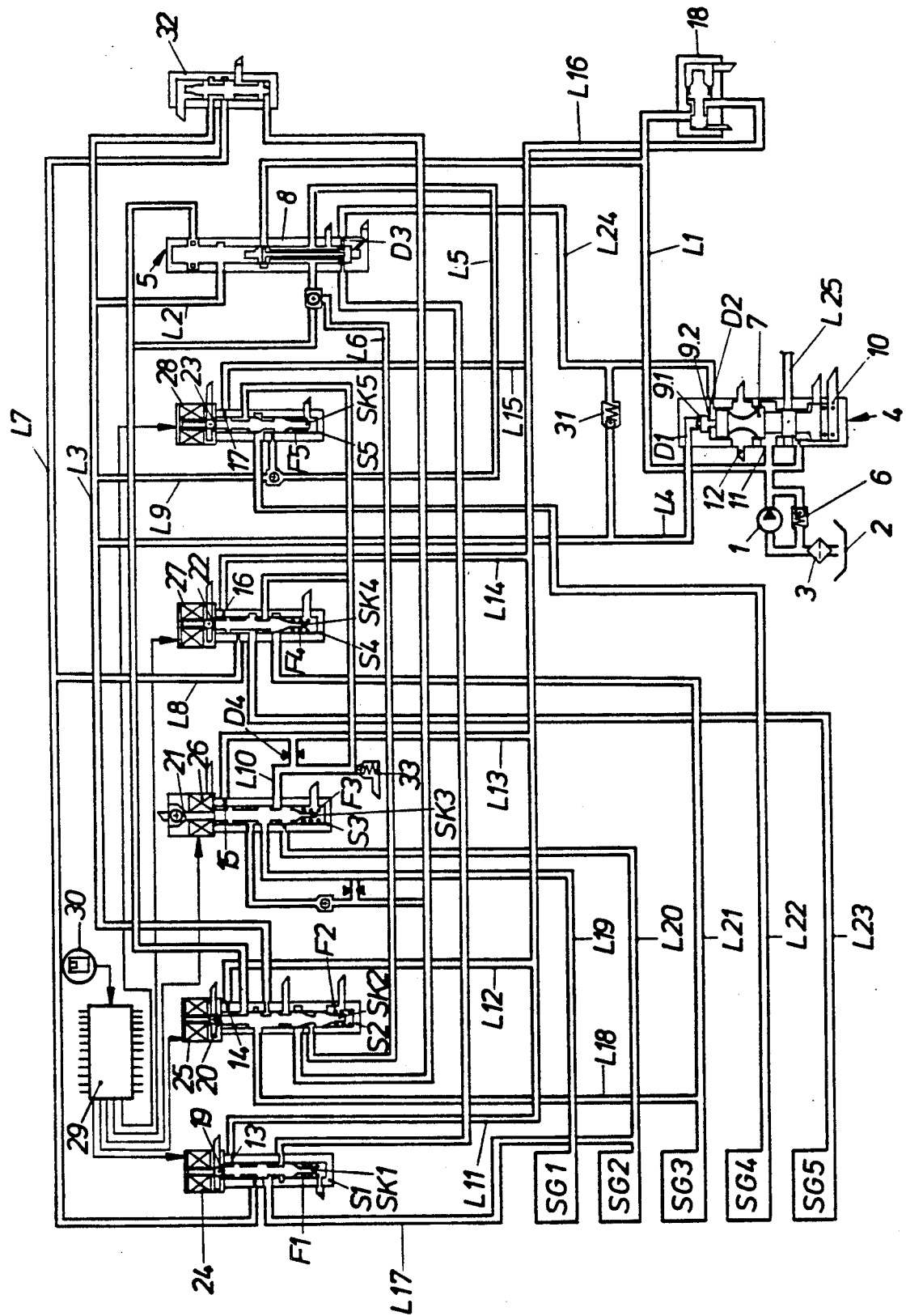

HYDRAULIC CONTROL FOR SHIFT ELEMENTS OF AN AUTOMATIC TRANSMISSION

BACKGROUND OF THE INVENTION

This invention relates to hydraulic control systems for automatic transmissions.

German Offenlegungsschrift No. 29 01 051 discloses a hydraulic control system for an automatic transmission in which electromagnetically operable pressure-control valves with flow-proportioning response are provided for the actuation of shift elements. In this way it is possible to use an electronic control device with a low cost transmission to control shifting into the forward or reverse or neutral transmission condition, depending upon the position of the pressure control valves. In its basic concept, the operation of transmission shift elements by electromagnetically operable valves in response to a central control unit is advantageous. When put into practice, however, the embodiment described in Offenlegungsschrift No. 29 01 051 would require an unreasonably large size for the hydraulic control system.

SUMMARY OF THE INVENTION

Accordingly, it is an object of the present invention to provide a hydraulic control system for the shift elements of an automatic transmission which overcomes the abovementioned disadvantage of the prior art.

Another object of the invention is to provide an improved hydraulic control system for an automatic transmission which has the smallest possible size.

These and other objects of the invention are attained by providing an automatic transmission control system with at least one slide valve and an electromagnetic valve responsive to a control unit wherein at least one face of the slide valve is responsive to applied pressure.

The provision of a slide valve in conjunction with a controlled electromagnetic valve pursuant to the invention not only permits an especially compact construction, but also makes it possible to utilize conventional slide valve designs from existing hydraulic control systems. Practical application of the invention, therefore, need not require a costly redesign of the valve housing containing the slide valves. A valve housing arrangement already available can be modified by appropriate adaption at very low cost in comparison to a new design, so that a production line already in operation for large scale manufacture can continue to be used. Moreover, the hydraulic control system according to the invention is in principle not readily susceptible to failure, because rugged and proven arrangements can be utilized for both the slide valves and the electromagnetic valves. Pursuant to a refinement of the invention, however, a safety function is additionally provided in case the main pressure control slide binds. In this refinement a line connects the main pressure valve and the manual slide through an emergency valve which is acted upon by pressure so that the slide valve piston in the main pressure valve can be released by a pressure pulse from any binding resulting from a malfunction.

BRIEF DESCRIPTION OF THE DRAWINGS

Further objects and advantages of the invention will be apparent from a reading of the following description in conjunction with the accompanying drawing which is a schematic hydraulic circuit diagram illustrating a representative hydraulic control system for a four speed automatic transmission arranged in accordance with the invention.

DESCRIPTION OF PREFERRED EMBODIMENTS

In the typical hydraulic control system illustrated schematically in the drawing, a pump 1 supplies main pressure from an oil sump 2 through a filter 3, as a function of a main pressure valve 4, to a line L1 leading to a manual slide valve 5. A first pressure-relief valve 6 ensures that unacceptably high pressures are not supplied to the line L1 by the pump 1. The main pressure level is regulated in the main pressure valve 4 by a slide piston 7. A hollow piston 8 in the slide valve 5 is connected to a manual shift selection lever, not shown in the drawing, which is capable of being fixed in selected positions, i.e., P (park), R (reverse), N (neutral), and D (drive with four forward steps, 1, 2, 3 and 4). If the hollow piston 8 is in the position D assigned to the forward drive steps, main pressure reaches a first control face 9.1 of the slide piston 7 through three lines L2, L3 and L4 and a throttle D1. The slide piston 7 also has a second control face 9.2 which will be described below. If the main pressure in the lines L1-L4 exceeds a given value, the slide piston 7 is moved downward against the action of a restoring spring 10 because of the pressure applied to the first control face 9.1, so that the flow of liquid at the main pressure valve 4, acted on by main pressure from the pump 1, is conveyed through an inlet 11 to an open outlet 12.

The throttle D1, acting as damping element, assures that release of the main pressure does not take place immediately with each pressure pulse. The main pressure, which is supplied to various lines depending upon the position of the hollow piston slide 8, can be applied through the line L3 and six further lines L5 to L10, to five slide valves S1-S5. These slide valves have corresponding slide pistons SK1-SK5 which are biased upwardly as viewed in the drawing by corresponding compression springs F1-F5 located in the valve housings. The position of each of the slide pistons SD1-SK5 is also capable of being changed by pilot control pressure applied through corresponding throttled inlet openings 13-17 in each of the valve housings.

The pilot control pressure is supplied to the slide valves S1-S5 though five further lines L11-L15 and is limited by a second pressure-relief valve 18, which is supplied with the main pressure delivered from the pump 1 through the line L1, as is the manual slide valve 5. The pilot control pressure determined by the second pressure-relief valve 18 is then applied through a line L16 to the lines L11-L15. Discharge openings 19-23 in the housings of the valves S1-S5, respectively, permit the slide pistons SD1-SK5 to be relieved of the pilot control pressure by operation of corresponding electromagnetic valves 24-28, depending upon the extent of the valve opening. As a result, the slide pistons SK1-SK5 are displaced upwardly as shown in the drawing by the springs F1-F5, by a distance corresponding to the extent of the valve opening.

The electromagnetic valves 24-28 are proportioning valves which adjust the discharge openings 19-23 to an appropriate opening cross section depending upon the energization provided. The valve energization is a function of signals transmitted from a control unit 29 through unlabelled lines represented in the drawing by short projections from the unit 29. A sensor device 30, illustrated schematically in the drawings, senses various operating conditions of the automatic transmission, which is not further illustrated in the drawing, and supplies corresponding signals to the control unit. One of many parameters characterizing the operating condition of the transmission may, for example, be the input shaft speed of the transmission. Five shift elements SG1-SG5 of the transmission are each capable of being acted on separately by main pressure applied through corresponding lines L17-L23, the pressure level being individually adjustable at the slide valves S1-S5 for the particular shift elements SG1-SG5. The shift elements SG1-SG5 are part of a four-speed automatic transmission wherein the shift elements SG1-SG2 are designed in the usual manner as band brakes and the shift elements SG3-SG5 are conventional multiple disk clutches.

Of particular importance is a connecting line L24, which is connected through a throttle D2 to the main pressure valve 4 and through a throttle D3 to the manual slide valve 5. For reasons to be described hereinafter, the cross section of the throttle D3 is smaller than that of the throttle D2. The lines L4 and L24 are capable of being connected together via an emergency valve 31. The function of the latter will also be explained hereinafter in connection with the functions of the throttles D2 and D3. The main pressure valve 4 is connected through a line L25 with a pressure-slide converter, not shown in the drawing, which actuates a hydrodynamic converter for the four-speed automatic transmission. A safety slide 32 connected to the lines L3 and L7 is designed so that erroneous actuation of corresponding shift elements caused by electronic failure when the manual selection lever is positioned in the drive step "1" is prevented.

Of great importance, finally, are a residual pressure valve 33 connected to the line L10 and a throttle D4. The lines L10 and L13 are interconnected through the throttle D4 so that the pilot control pressure supplied through the line L16 acts on the slide pistons SK3, SK4 and SK5. The cooperation of the residual pressure valve 33 and the throttle D4 will likewise be explained below.

When the four-speed automatic transmission is operated, for example, in the second speed, the shift elements SG2 and SG3 must be activated so that a drive moment can be transmitted through them from the input shaft of the transmission to the output shaft of the transmission. The power gear drive, which is not further illustrated, is arranged so that, for hydraulic shifting from the second speed to the third speed, venting of the shift element SG2 and activation of the shift element SG4 take place with shift element SG3 activated as usual. Upon hydraulic shifting into second speed, the manual selection lever, not illustrated, is in the "D" position. The result of this is to displace the hollow piston slide 8 into a position in which a connection is produced between the lines L1 and L2. Consequently, the shift element SG3 is acted upon by main pressure applied through the lines L2 and L3, the slide valve S2 and the line L18. At the same time the control unit 29 operates the electromagnetic valve 25 so that the outlet 20 is selectively opened to ensure a given pressure buildup at the shift element SG3. Because of the action of the bias spring F2, the slide piston SK2 is maintained in the position shown in the drawing, so that the main pressure can act on the slide valve S2.

Application of the main pressure to the shift element SG2, which is necessary for activation of the second speed, is effected through the lines L2 and L3, the safety slide valve 32, the line L7, the slide valve S1 and the line L17. In this case, the electromagnetic valve 24 is operated so that the outlet opening 19 is closed. The relief pressure applied to the line L11 is thus able to displace the slide piston SK1 downward against the action of the spring F1 so that the lines L7 and L17 are interconnected. The connection between the lines L7 and L17 may alternatively be produced by selective flow provided in the electromagnetic valve 24 so that a given pressure buildup occurs at the shift element SG2. In addition the outlet 23 is closed by the electromagnetic valve 28 so that the slide piston SK5 is moved downwardly against the action of the spring F5 by the pilot control pressure applied to the line L15, cutting off the line L22 leading to the shift element SG4 from the main pressure applied to the line L19. The electromagnetic valves 26 and 27 are simultaneously displaced to open the outlets 21 and 22.

Upon shifting up from second to third speed, the shift element SG2 must be vented as already mentioned above and the shift element SG4 activated by the main pressure. For this purpose, the control unit 29 actuates the electromagnetic valve 28 so that the outlet 23 is opened permitting the slide piston SK5 to be moved upwardly by the spring F5. This connects the line L9 through the slide valve S5 with the line L22 leading to the shift element 4. Operation of the electromagnetic valve 24 opens the outlet 19, thereby venting the shift element SG2. This also permits the slide piston SK1 to move upwardly and thus disconnects the main pressure in the line L7 from the line L17. In the third transmission speed, the electromagnetic valves 25, 26 and 27 are in the same condition as in the second transmission speed.

The chronological sequence of the operations of the electromagnetic valves necessary for the shifting procedures is established by the control unit 29. Thus, for example, the rate of venting or other action of the shift elements to be operated is a function of a power output stage of an internal combustion engine driving the automatic transmission and also a function of the speed of the input shaft of the transmission. Rapid transition from idling condition of the shift elements may alternatively be assured by appropriate operation of the electromagnetic valves so that the separate control slide conventionally used may be omitted. The conventional overlapping slides, which are generally provided to maintain a given residual pressure at a shift element to be vented so as to make the main pressure in the shift element available as quickly as possible upon shifting action, may likewise be omitted. Abandonment of all these types of slides permits direct connection of the shift elements SG1-SG5 to their respectively assigned slide valves S1-S5. The resultant shortening of hydraulic paths leads to a considerable reduction of the lag times which normally occur in transmission systems and so increases the spontaneity of overall control. At the same time, the reliability of the system is enhanced because the number of physical elements potentially subject to failure is considerably reduced.

Sensitiveness of control is also obtained since the electromagnetic valves, which are proportioning valves, activate only an element controlling the main pressure and do not control the main pressure itself, as in the above-mentioned Offenlegungsschrift No. 29 01

051. Also, the volume of fluid circulated in a four-speed automatic transmission having the system of that reference would, with direct control of the main pressure by the electromagnetic valves, result in an unacceptably large physical size for the control system.

In the typical example represented schematically in the drawing, the connecting line L24, in cooperation with the throttles D2 and D3 and the emergency valve 31, is of particular importance. Should the piston 7 in the main pressure valve 4 bind because of fouling, for example, unacceptably high pressures might occur in the whole transmission control system because the main pressure returned through the line L4 and the throttle D1 to the piston 7 would no longer be able to move the piston 7 downwardly against the action of the spring 10 to release the main pressure. When a given pressure of, for example, 15 bar, is exceeded in the line L4 in the illustrated system, the emergency valve 31 opens and places the connecting line L24 under pressure. The cross section of the throttle opening D3 is smaller than that of the throttle D2 so that the high pressure supplied to the connecting line L24 through the emergency valve 31 becomes effective first at the main pressure valve 4. Thus, the force resulting from a pressure pulse produced by the opening of the valve 31 applied to the control face 9.2 of the piston 7 is great enough to release the piston 7 from binding so that the main pressure is again applied to the outlet 12. This structural measure still further increases the reliability of the transmission control system.

Especially high speed of operation of the shift elements is obtained in the illustrated example pursuant to the invention by the cooperation of the residual pressure valve 33 and the throttle D4. Normally, the residual pressure valve 33 assures that the shift elements SG1–SG5 remain filled with pressure medium. Because of irregularities in the operation of the control system, however, it is quite possible that pressure medium depletion of at least some individual shift elements may occur to a greater or lesser extent through the residual pressure valve 33. The connection between the lines L10 and L13 through the throttle D4 assures that the pressure medium can constantly be supplied through at least one of the slide valves S3 to S5, so that pressure medium depletion of the shift elements is effectively prevented. A constantly reproducible pressure medium supply in the shift elements is thus ensured. The pressure of the pressure medium continuously supplied to the shift elements, however, is insufficient to cause any shift element movement.

The control system described herein offers a plurality of alternative approaches for a low-cost construction. Thus, for example, it is possible to design a series of slide valves which are identical or at least similar in structure. In the example represented in the drawing, this applies particularly to the slide valves S1, S4 and S5. In addition, components which are already in common use may be utilized. Proven technology can likewise be used in the selection of proportioning valves. In this connection, it should be pointed out that, for the control system pursuant to the invention, simple proportioning valves without special characteristics can be used.

It is alternatively possible to use proportioning valves in which the pressure varies with the flow rate over a broad range. Such proportioning valves can be manufactured with relatively rough tolerances so as to provide effective starting points or low-cost fabrication.

Although the invention has been described herein with reference to specific embodiments, many modifications and variations therein will readily occur to those skilled in the art. Accordingly, all such variations and modifications are included within the intended scope of the invention.

I claim:

1. A hydraulic control system for an automatic transmission having a plurality of shift elements comprising pump means for producing main hydraulic pressure, pressure control valve means for controlling the main hydraulic pressure, manually controllable valve means for selecting a transmission condition, transmission control means, and a plurality of electromagnetically operable valve means, each of which individually controls the pressure level at a single corresponding shift element, wherein at least one of the plurality of electromagnetically operable valve means includes an electromagnetic proportioning valve which is responsive to the transmission control means and a single slide valve associated with the electromagnetic proportioning valve, the electromagnetic proportioning valve being arranged to apply pressure at a selectively controllable level to at least one control face of the single associated slide valve which is capable of being acted on by pressure at the level determined by the associated electromagnetic proportioning valve.

2. A hydraulic control system according to claim 1 wherein the plurality of electromagnetically operable valve means includes at least two slide valves which are of the same design.

3. A hydraulic control system according to claim 1 wherein the slide valve is arranged for activation by a pilot control pressure.

4. A hydraulic control system according to claim 1 wherein at least one of the shift elements is hydraulically connected directly with a corresponding electromagnetically operable valve means.

5. A hydraulic control system according to claim 1 wherein the pressure control valve means has a control face arranged so that, when a selected level of the main hydraulic pressure is exceeded, a control face of the slide valve is acted on by the main hydraulic pressure.

6. A hydraulic control system according to claim 1 including a connecting line between the manually controllable valve means and the pressure control valve means, and an emergency valve for supplying pressure to the connecting line when the main pressure exceeds a given value, and wherein the line openings leading to connections between the connecting line and the manually controllable valve means and the pressure control valve means, respectively, are of different cross-sectional size.

7. A hydraulic control system according to claim 6 wherein the main pressure control valve means includes a first safety throttle leading to the connecting line and the manually controllable valve means includes a second safety throttle leading to the connecting line.

8. A hydraulic control system according to claim 7 wherein the first safety throttle has an opening of greater cross section than that of the second safety throttle.

9. A hydraulic control system according to claim 1 wherein, for at least one slide valve, a line supplying the main pressure to the slide valve is connected through a throttle with a line supplying pilot control pressure.

10. A hydraulic control system according to claim 9 including a residual pressure valve connected to the line supplying the main pressure to prevent emptying of a shift element.

11. A hydraulic control system according to claim 9 including plurality of slide valves connected to the line supplying the main pressure.

* * * * *

UNITED STATES PATENT AND TRADEMARK OFFICE
CERTIFICATE OF CORRECTION

PATENT NO. : 5,201,252
DATED     : April 13, 1993
INVENTOR(S) : Ludwig Prüss

It is certified that error appears in the above-identified patent and that said Letters Patent is hereby corrected as shown below:

Title page, Item [75]:    "Brunswick" should read --Braunschweig--;

Column 2, line 42, "SD1" should read --SK1--;

Column 2, line 55, "SD1" should read --SK1--;

Column 6, line 44, delete "line openings leading to".

Signed and Sealed this

Twenty-ninth Day of March, 1994

Attest:

BRUCE LEHMAN

Attesting Officer        Commissioner of Patents and Trademarks